United States Patent [19]
Bell

[11] 3,883,040
[45] May 13, 1975

[54] PNEUMATICALLY OPERABLE GATING MECHANISM

[76] Inventor: Peter Martin Bell, 83 Queens Rd., Cheadle Hulme, Stockport, Cheshire, England

[22] Filed: Oct. 25, 1973

[21] Appl. No.: 409,765

Related U.S. Application Data

[63] Continuation of Ser. No. 198,694, Nov. 15, 1971, abandoned.

[30] Foreign Application Priority Data
Nov. 14, 1970 United Kingdom............... 54298/70

[52] U.S. Cl................. 221/224; 221/276; 221/278; 221/289
[51] Int. Cl............................................... B65h 5/22
[58] Field of Search .......... 221/268, 278, 289, 290, 221/299, 311, 276, 251, 224, 226; 222/442

[56] References Cited
UNITED STATES PATENTS
2,192,503    3/1940    Newman.......................... 221/290 X
2,540,604    2/1951    Van Sittert et al............. 221/278 X
2,544,165    3/1951    Krasnow......................... 221/299 X FOREIGN PATENTS OR APPLICATIONS
468,197    10/1928    Germany............................ 221/299

Primary Examiner—Stanley H. Tollberg
Assistant Examiner—Joseph J. Rolla
Attorney, Agent, or Firm—Robert C. Miller

[57] ABSTRACT

A pneumatic gating mechanism which comprises a spool valve movable between two positions. In one position of the spool valve a supply line for gated items such as screws is connected to a delivery line and in the other position an air feed line is connected to the delivery line to blow said gated items therealong. A gate in said supply line is connected to the spool valve and opens and closes on movement of the spool valve. The gating mechanism may be combined with a pneumatically operable tool such as a screw driver and the pneumatic circuits of tool and gating mechanism linked so that items are gated only when the tool is not operating.

2 Claims, 6 Drawing Figures

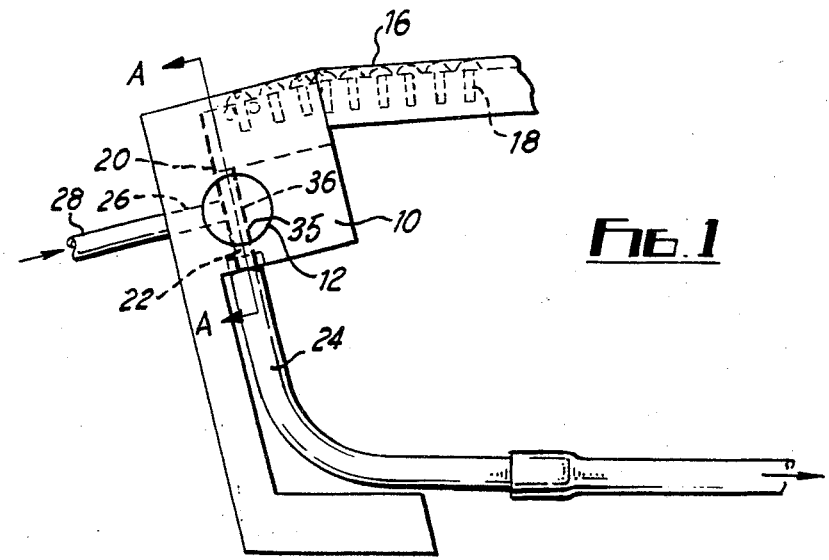
Fig.1
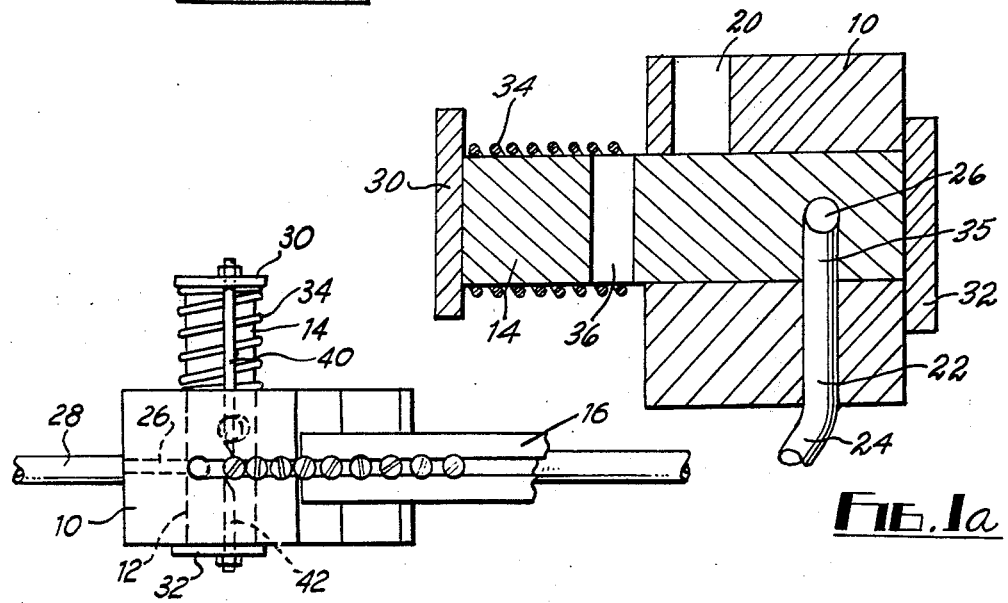
Fig.1a
Fig.2

PNEUMATICALLY OPERABLE GATING MECHANISM

This is a continuation of application Ser. No. 198,694, filed Nov. 15, 1971, now abandoned.

This invention relates to a pneumatically operable gating mechanism.

According to the invention there is provided a pneumatically operable gating mechanism comprising a spool valve movable between two positions in response to pneumatic pressure, a supply line for feeding items to be gated to the mechanism, a delivery line through which gated items are delivered from the mechanism, an air feed line, the spool valve being arranged such that in one position the air-feed line is connected to the delivery line and such that in the other position the supply line is connected to the delivery line and the air feed line is closed.

In a preferred embodiment of the invention gating means are provided which are movable with the spool valve and operable to sequentially permit a predetermined number of items, preferably one, to be delivered from the supply line to the delivery line when the spool valve moves into said one position.

Gating mechanisms according to the invention are particularly useful in supplying items to pneumatically operable tools such as the supply of screws to screw drivers. Because both tool and mechanism are pneumatically operable the two may be linked together such that a screw is delivered at the appropriate instant to the tool. Thus a preferred aspect of the invention provides a gating mechanism according to the invention in combination with a pneumatically operable tool, wherein the delivery line from the gating mechanism is connected to a hollow piston member comprised in the tool. The piston member is arranged to be movable relative to the main body of the tool whereby the tool can be made to operate in response to movement of the piston member.

Specific embodiments of the invention will now be described by way of example with reference to the accompanying drawings in which;

FIG. 1 is a diagrammatic side elevation view of a gating mechanism;

FIG. 1a is a cross-sectional view of the gating mechanism taken along line A—A of FIG. 1;

FIG. 2 shows the mechanism of FIG. 1 in plan;

Figure 3:
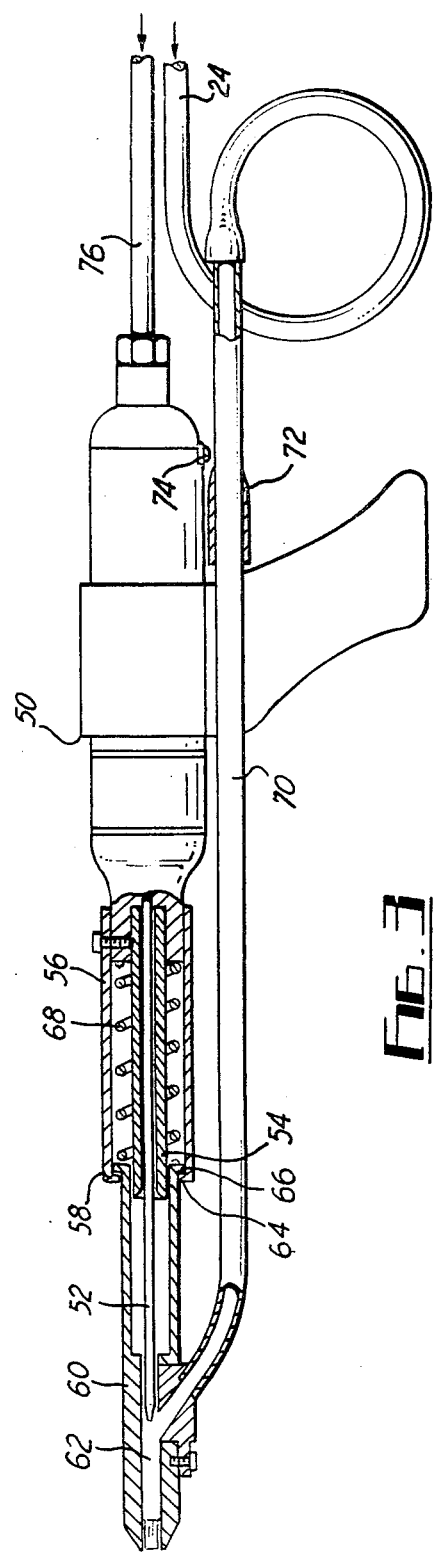
FIG. 3 shows in partial section a pneumatically operable screw driver.

Referring to FIGS. 1 and 2 the gating mechanism comprises a casing 10 having a bore 12 formed therein in which a valve spool 14 is movable. A supply line 16 for screws 18 leads into a passage 20 in the casing which passage extends to the bore 12. A passage 22 extends from the diametrically opposite side of the bore through the casing and to a delivery line 24. At right angles to the passages 22 and 20 and in the same plane thereof, a passage 26 extends from the bore through the casing to an air feed line 28.

The valve spool 14 comprises a cylindrical body having a flange 30 and 32 at each end thereof to limit movement of the spool in the bore. A spring 34 is positioned between the casing and the upper flange 30 (as viewed in FIG. 2) so as to urge the spool upwardly with the lower flange 32 in engagement with the casing. A port 35 is provided in the spool which, in the position shown in FIG. 2 connects the air feed line 28 to the delivery line 24. A second port 36 is also formed diametrically through the spool at a location spaced axially upwardly of the first mentioned port. This second port is arranged to connect the supply line to the delivery line when the valve spool is urged downwardly against the spring, by pneumatic means (not shown) such that the upper flange 30 engages the casing.

A release gate is fixed to the valve spool and movable therewith. The gate comprises a rod 40 extending from the upper end of the spool towards the lower end and axially parallel therewith and a second rod 42 extending upwardly from the lower end of the spool in the same plane as the first rod. The free ends of the rods are spaced apart from each other and are chamfered to define a gap which in the position of the valve shown in FIG. 2 is adjacent the supply line and inclined thereto.

Referring now to FIG. 3 there is shown an air operated screw driver comprising an air motor and the reduction gear box enclosed within a casing 50. This part of the tool is well known. A screw driver bit 52 is coupled to the gear box output shaft. The portion of the bit adjacent the gear box is held in place by a bearing 54 and the bearing is surrounded by a hollow cylindrical shroud 56 secured at one end to the casing and being open at the other end. The walls at said other end are inturned so as to define an annular shoulder 58.

A substantially cylindrical piston member 60 is slidably movable in the shroud and is provided with an axial bore 62 to accommodate the screw driver bit. The axial bore is of enlarged diameter at the end 64 adjacent the shroud to accommodate the bearing. An outwardly directed flange 66 is provided at the said end 64 of the piston member, which flange is urged against the shoulder 58 by a spring 68.

A tube 70 leads from the bore 62, just short of the end thereof, and is connected to the delivery line 24 from the gating mechanism. A cam surface 72 is provided on the tube, which is arranged, on relative movement of the tube and the casing to engage and actuate a switch 74 for the air motor. The motor is supplied with air through a supply line 76 from a source (not shown).

Figure 4:
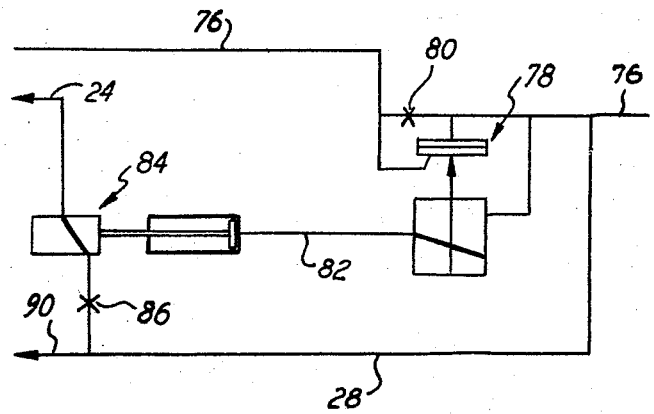
FIGS. 4 and 5 show the pneumatic circuit coupling the gating mechanism and the tool with the tool motor drive 'off' and 'on' respectively.
Figure 5:
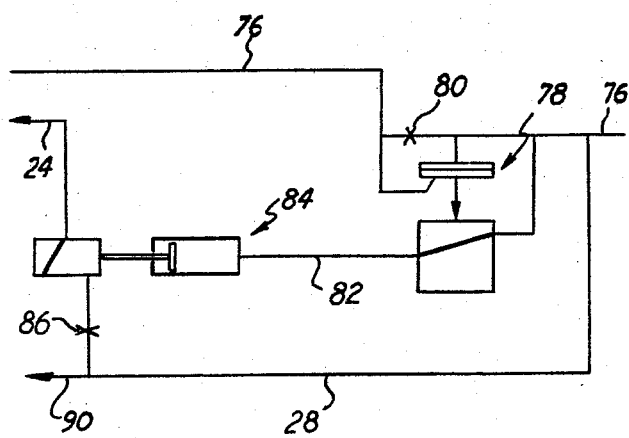

FIGS. 4 and 5 show the pneumatic circuit coupling the gating mechanism and the screw driver. A differential pressure switch 78 is provided in the supply line 76, the sensitivity of the switch being determined by a restrictor orifice 80 in the line 76 and downstream of the switch 78. A line 82 leads from the switch to the gating mechanism indicated generally at 84 and the air feed line 28 leads from line 76 upstream of the switch 78 to the gating mechanism through a flow restrictor 86.

The apparatus described above operates as follows: Screws 16 are oriented in a suitable means such as a pneumatically operable bowl feeder not shown and led from the bowl feeder under gravity to the gating mechanism along the supply line 16 and collect against rod 42 of the release gate. Where the screws are oriented by a pneumatically operable device such as a bowl feeder, the device, is conveniently supplied with the air from an air line 90 leading from line 28.

At the commencement of operations the gating mechanism is in the position shown in FIG. 2 and the pneumatic circuit is as shown in FIG. 4. Thus at this stage the air motor in the tool is not in operation and air flows through line 28, the first valve port, line 24, tube 70 and out of the open end of piston member 60. The tool is now held against the work piece so as to urge the piston member into the shroud against the spring. This movement of the piston member causes corresponding movement of the tube relative to the tool casing so that the cam 72 engages the switch 74 and actuates the air motor in the tool.

With the air motor operating the pressure differential across the switch 78 is sufficient to actuate it so that air is delivered along line 82 to the gating mechanism. The spool is thus moved downwardly (as viewed in FIG. 2) thereby enabling the screw abutting the rod 42 to move through the inclined gap between rods 40 and 42, the next succeeding screw thereafter abutting the rod 40. As the spool moves downwardly the air from line 28 is cut off and the screw admitted through the release gate drops into port 36 and passes into the delivery line 24. The pneumatic circuit is now in the condition shown in FIG. 5.

Pressure on the free end of piston member is now relieved so that it moves outwardly by virtue of spring 68 carrying tube 70 therewith. The cam 72 thus disengages from switch 74 and the air motor is turned off. The differential air pressure across the switch 78 is now such as to return the switch to the position shown in FIG. 4 so that the air supply along line 82 is discontinued and the valve spool moves upwardly by virtue of spring 34. The air feed line is now re-connected to the delivery line whereby the screw in the delivery line is blown through tube 70 into the bore 62 in the piston member. The apparatus is now ready for use.

The tool is now applied to a work piece at the position where a screw is to be inserted and the piston member urged into the shroud. The screw driver bit now engages the screw in the piston member and is driven home since the air motor in the tool is now on by virtue of the cam engaging switch 74. As this is taking place a further screw is allowed to fall into the delivery line through the gating mechanism which, on release of the piston member is blown through line 24 and tube 70 in the piston member so that the apparatus is immediately ready for further operation.

The invention is not restricted to the above described embodiment, many variations being possible without departing from the scope thereof.

Thus under certain circumstances, particularly when relatively small and/or light weight screws are being handled by the device it is advantageous to incorporate a further limit switch or valve in line 28 operable on downward movement of the spool to close-off the air supply from line 28 into passage 26. The further limit switch or valve in line 28 is preferably controlled by the movement of the spool, so that when the spool moves upwardly the said further limit switch or valve will be opened to admit air from line 28 into passage 26.

What is claimed is:

1. A pneumatically operable feed and gating mechanism for items having a head portion and a shank portion, comprising a spool valve movable between two positions in response to pneumatic pressure, a supply line for feeding said items to be gated to the mechanism, a delivery line spaced from said supply line along the axis of said spool valve through which said gated itmes are delivered from the mechanism, an air feed line, the spool valve being constructed with axially spaced ports such that in one position one of said ports connects the air feed line to the delivery line and such that in the other position the other of said ports containing one of said items is connected to the delivery line and the air feed line is closed, and a gating mechanism movable with said spool valve and comprising coaxially aligned rods extending from each end of said spool and defining an inclined slot between the free ends of said rods to permit one of said items to be delivered from the supply line to the delivery line when the spool valve moves into said other position.

2. A mechanism as claimed in claim 1, and further comprising a valve operable to close the air feed line when said spool valve is in said other position.

* * * * *